United States Patent [19]

Pearce

[11] Patent Number: 4,634,336

[45] Date of Patent: Jan. 6, 1987

[54] BALE LOADER

[76] Inventor: Arthur W. Pearce, Weering, Victoria, Australia

[21] Appl. No.: 695,823

[22] Filed: Jan. 28, 1985

[30] Foreign Application Priority Data

Feb. 9, 1984 [AU] Australia ............................... PG3547
Feb. 29, 1984 [AU] Australia ............................... PG3836

[51] Int. Cl.⁴ ............................................ A01D 90/00
[52] U.S. Cl. .................................... 414/546; 414/24.5; 414/501; 414/553; 414/679
[58] Field of Search ...................... 414/24.5, 24.6, 553, 414/679, 501, 546, 551, 554

[56] References Cited

U.S. PATENT DOCUMENTS

| | | | |
|---|---|---|---|
| 3,985,250 | 10/1976 | Mononen | 414/546 |
| 3,999,674 | 12/1976 | Meitl | 414/24.5 |
| 4,128,179 | 12/1978 | Gilbert | 414/551 |
| 4,257,732 | 3/1981 | Staffanson | 414/24.5 X |
| 4,459,075 | 7/1984 | Eichenberger | 414/24.5 |
| 4,514,127 | 4/1985 | Maier | 414/24.6 |
| 4,573,845 | 3/1986 | Carpenter | 414/24.5 |

FOREIGN PATENT DOCUMENTS

40936/78  4/1980  Australia.
2478610   9/1981  France ........................... 414/24.5

*Primary Examiner*—Robert J. Spar
*Assistant Examiner*—Janice Krizek
*Attorney, Agent, or Firm*—Nies, Webner, Kurz & Bergert

[57] ABSTRACT

A bale loader comprises a pair of arms pivoted to a wheeled frame and movable vertically. The arms carry, at their outer ends, a platform which is pivoted to the arms and movable between an upright position to a position parallel with the arms. The platform carries a pair of pivoted tynes which, when the platform is moved to the upright position, extend along the ground to engage beneath a bale. Hydraulic cylinders acting between the platform and the frame causes pivotal movement of the platform to lift the bale and a further cylinder lifts the platform and arms about the pivotal attachment to the frame whereby the bale is discharged to a feeder or the like. A movable carriage on the arms assists in discharge of the bale from the platform.

8 Claims, 4 Drawing Figures

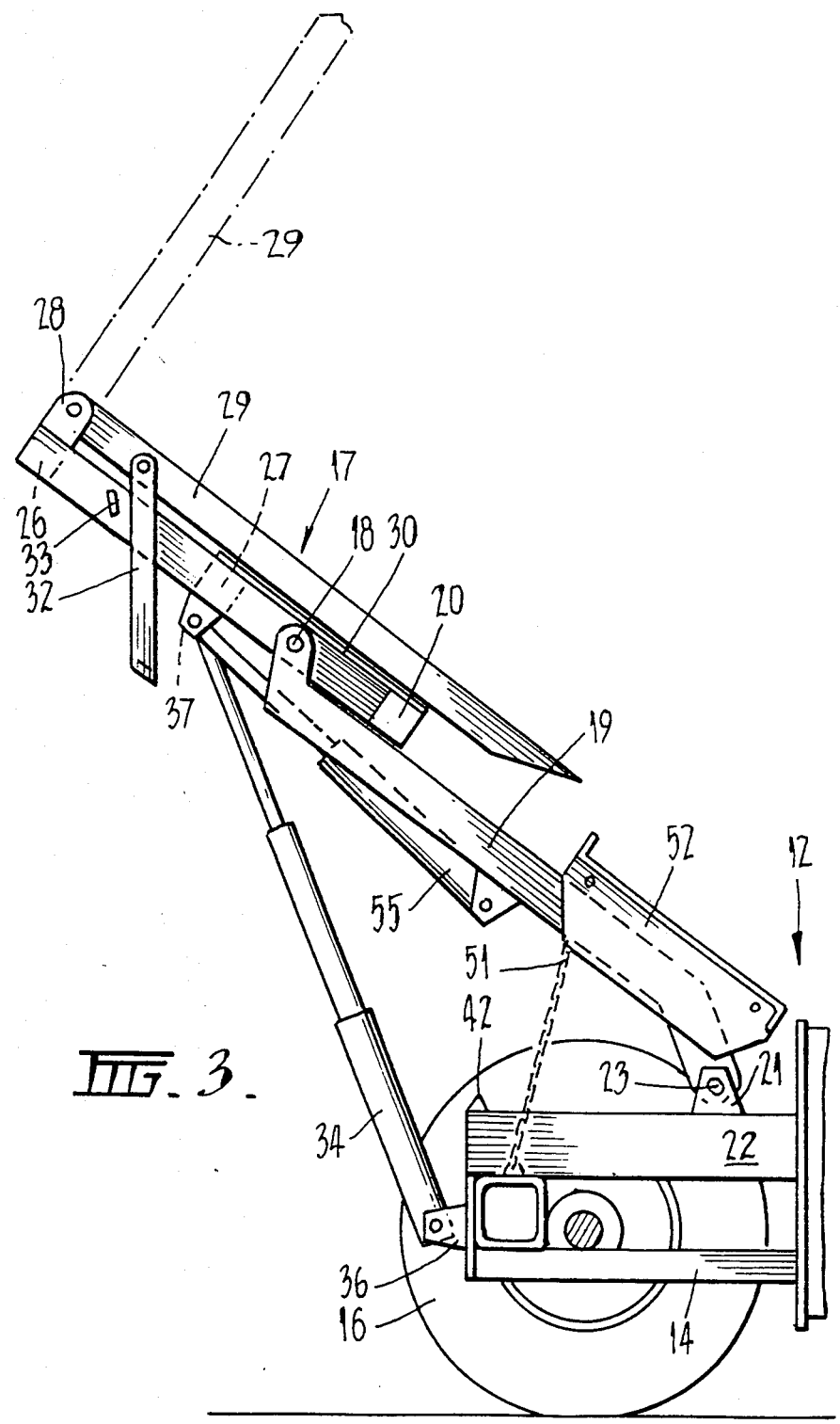

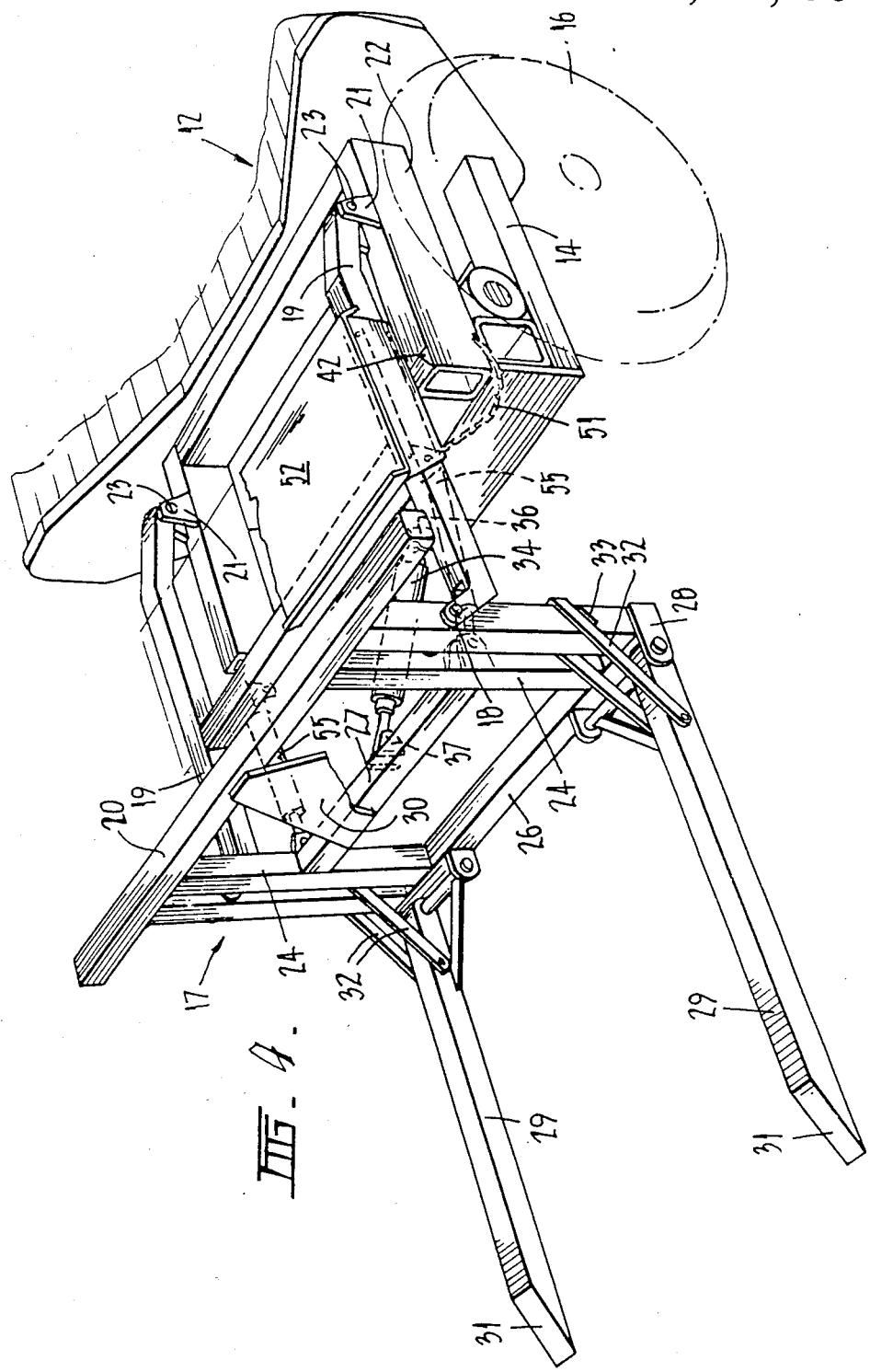

BALE LOADER

BACKGROUND OF THE INVENTION

This invention relates to a bale loader and relates particularly to an improved bale loader for loading bales of hay, straw and the like onto a trailer or a bale feeder or bale transport apparatus, or the like.

The invention is particularly concerned with a bale loader which is able to handle bales of all shapes and to pick up such bales from the ground for loading purposes.

BACKGROUND ART

It is known to provide bale loaders for picking up bales of hay, straw or the like from the ground for loading onto trailers, bail feeders and like apparatus. Such previously known loaders, however, are relatively complicated and are therefore relatively expensive to manufacture. Such previously known bale loaders include self-propelled and tractor mounted scoops and forks which are used to engage the bale for loading onto the bale handling equipment.

Another form of bale handling device is disclosed in Australian Pat. No. 509,890 in which a rope or cable is used to move the bale onto a conveyor. This arrangement is relatively time consuming and requires substantial operator assistance.

Another bale loader is disclosed in Australian Patent Application No. 40936/78 in which a loading mechanism is mounted to a bale feeder by a connection which allows the loader to jackknife relative to the bale feeder. In the jackknifed position, a pair of forks are engaged beneath the bale by movement of the apparatus in an engaging direction. Reversal of the movement enables a tipping mechanism to engage with the ground and lift the loader to a position whereat the bale can be discharged into the bale feeder. This arrangement requires substantial manual manipulation of various parts of the apparatus and is dependent for successful operation on appropriate engagement of links or arms with the ground during movement of the loader.

It is an object of the present invention to provide an improved form of bale loader which is relatively simple in construction and therefore relatively economical to manufacture.

It is also an object of the present invention to provide an improved form of bale loader which is relatively simple to operate and which may be used to load bales of any shape onto a trailer, bale feeder or other bale handling apparatus.

It is also an object of the present invention to provide a bale loader which may be directly mounted on, and form part of a bale feeder, such as the bale feeder described in my copending application, Ser. No. 06/612,425, now U.S. Pat. No. 4,545,716.

SUMMARY OF THE INVENTION

In accordance with the present invention there is provided a bale loader comprising a pair of support arms each pivotally mounted at one end to a frame of a wheeled trailer or the like, said support arms being movable in substantially vertical planes, means to restrict downward movement of said support arms, a loader platform pivotally mounted to and carried by the other ends of said support arms, said loader platform being movable between a first position in which the platform is substantially upright when said support arms are in their lowermost position and a second, loading, position, a pair of tynes pivoted to said loader platform to extend therefrom at a predetermined angle when said platform is in said first position, and actuating means operable to move the platform between first and second positions and to move the arms and platform relative to the frame.

Preferably, the actuating means includes hydraulic cylinders adapted to be connected to the hydraulic system of a tractor or the like. In one form of the invention, a pair of hydraulic cylinders is used to move the platform between the first and second positions and a third hydraulic cylinder is used to move the platform and arms relative to the frame. However, it will be appreciated that a single hydraulic cylinder may be used for both movements.

Preferably, the support arms are pivotally connected to the loader platform part-way along its length so that, in its upright position, the platform extends above the level of the arms. The tynes extend from one end of the platform so as to be adjacent the ground when the platform is in its upright position and the arms are in their lowermost position.

In the preferred form of the invention, the bale loader is mounted on the back of the bale feeder described in my copending patent application Ser. No. 06/612,425, now U.S. Pat. No. 4,545,716 . The bale loader of this invention is, therefore, particularly adapted to load bales directly into the bale feeder.

It is also preferred that a movable plate or carriage is mounted on the arms so as to assist movement of a bale from the platform onto the bale feeder. The plate or carriage is movable from a position adjacent the platform towards the bale feeder, such movement being under the influence of gravity but being assisted, if necessary, by flexible links connected between the plate or carriage and the frame.

In order that the invention will be more readily understood, one embodiment thereof will now be described with reference to the accompanying drawings.

DESCRIPTION OF THE DRAWINGS

FIG. 3 is a further side elevational view of the loader of FIG. 1 in a further operative position, and FIG. 4 is a perspective view showing further details of the loader construction.

DESCRIPTION OF THE PREFERRED EMBODIMENT

Figure 1:
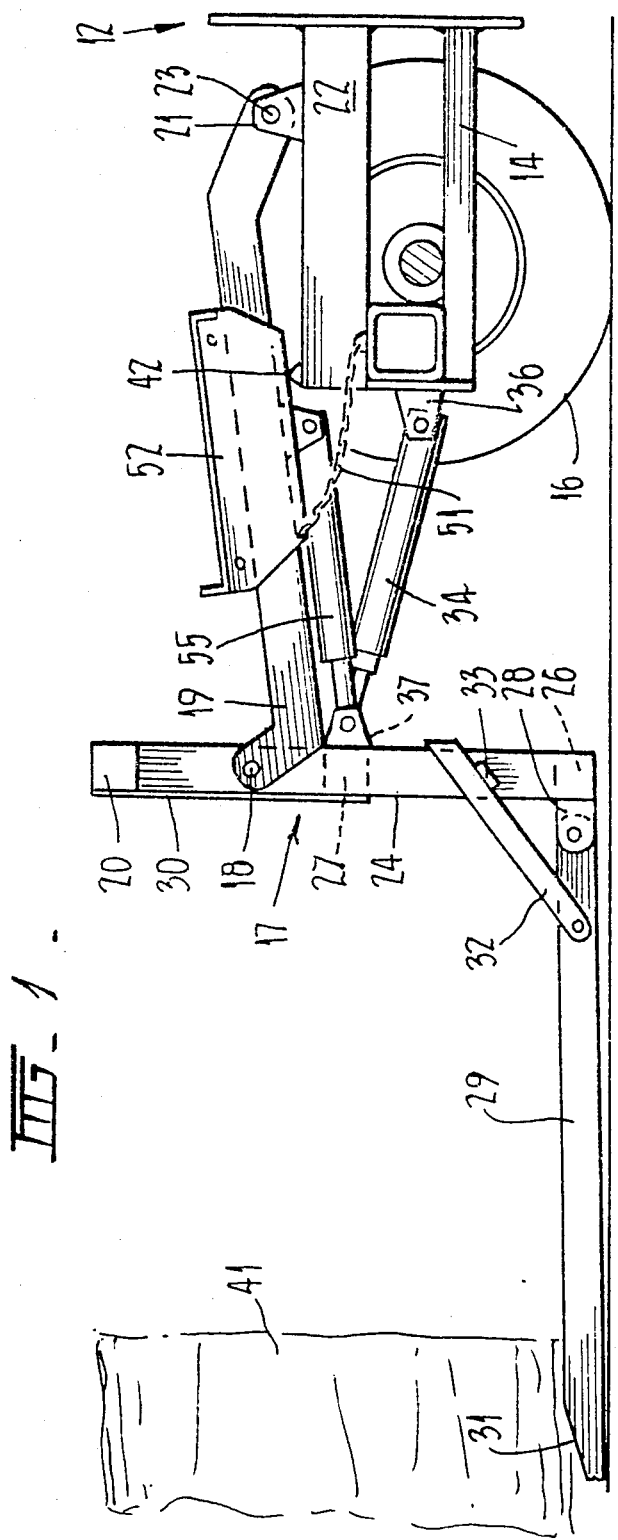
FIG. 1 is a side elevational view of a bale loader in accordance with the invention showing the loader in position to pick up a bale.

Referring to the drawings, the loader of this embodiment is designed particularly for mounting on the back end of a bale feeder, of the type described in my copending patent application Ser. No. 06/612,425, now U.S. Pat. No. 4,545,716. The feeder which is indicated by the numeral 12, is mounted on a frame 14 which is supported at one end by a pair of wheels 16.

Figure 2:
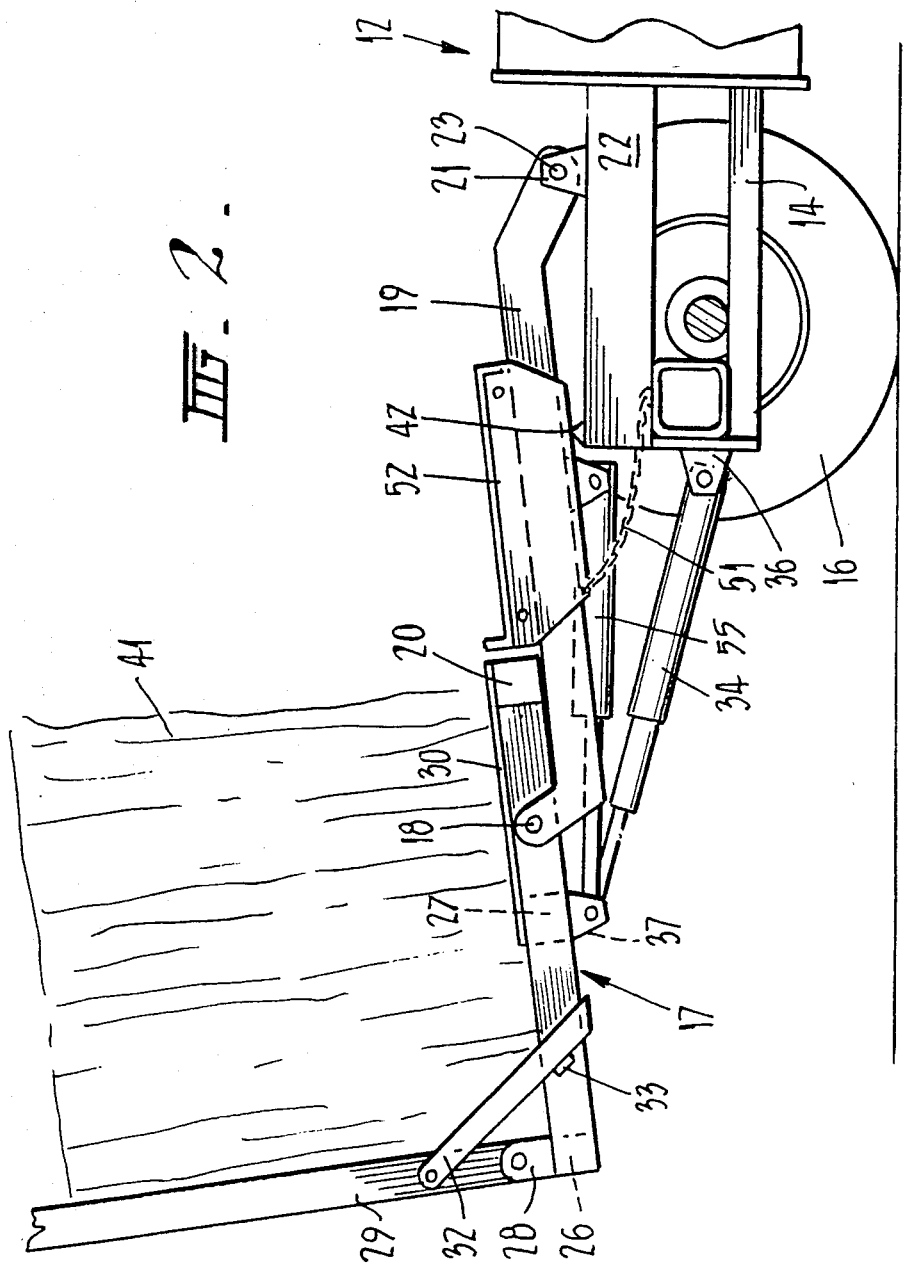
FIG. 2 is a view similar to that of FIG. 1 but showing the loader in a position after having picked up a bale.

The loader of the present invention comprises a platform 17 pivotally mounted by pivot pins 18 to a pair of arms 19 which are pivotally connected at their other ends to brackets 21 upstanding from the frame section 22 located on the feeder frame 14. The arms 19 are pivotal about pins 23 in the brackets 21 such that the arms 19 can move in substantially vertical planes. The other ends of the arms 19 pivotally engaging the platform 17 have offset portions so as to enable pivotal movement of the platform 17 about the pivot pins 18 to a position whereby the platform 17 lies in a plane substantially parallel to the plane of the arms 19, as shown in FIG. 2. A cross member 20, at the upper end of the platform 17, engages with the arms 19 in the pivotal position as shown in FIG. 2 thereby restricting further pivotal movement.

The platform 17 is constructed with a number of substantially parallel members 24 interconnected at their lower end by a transverse member 26 and connected at their upper ends to the cross member 20. An intermediate support bar 27 extends between the innermost members 24, and a triangular shaped cover plate 30 is mounted between the intermediate support bar 27 and the cross member 20.

The transverse member 26 is provided at its ends with brackets 28 which pivotally support a pair of tynes 29 which, in their operative position, extend rearwardly of the feeder 12. The tynes 29 have tapered ends 31 to facilitate engagement beneath a hay bale or the like on the ground. Pivotal movement of the tynes 29 relative to the brackets 28 is restricted by a pair of links 32 pivoted to the tynes 29 and which engage behind the outermost platform members 24. These outermost platform members each have guide plates 33 which support the links 32 relative to the members 24.

Pivotal movement of the platform 17 relative to the arms 19 is controlled by a pair of hydraulic cylinders 55 extending between the frame section 22 and brackets mounted on the intermediate support bar 27. Extension of the hydraulic cylinders 55 thus causes the platform 17 to pivot from the position shown in FIG. 1 to that shown in FIG. 2.

A further hydraulic cylinder 34 extends between a support 36 on the frame 14 and a bracket 37 extending from the intermediate support bar 27. This further hydraulic cylinder 34 is operable to move the arms 19 and platform 17 about the pins 23 in the brackets 21 to the position shown in FIG. 3. The hydraulic cylinders 55 and 34 are arranged to be connected to the hydraulic system of an agricultural tractor, or the like, and are operable by appropriate controls on the tractor.

A movable plate or carriage 52 is carried on the arms 19 and is movable between a position adjacent the cross member 20, when the platform 17 is in the position shown in FIG. 2, towards the feeder frame 14. Sliding movement of the carriage 52 may be facilitated by wheels or rollers (not shown) so that the carriage tends to move under the influence of gravity along the arms 19.

The carriage is connected by chains 51 to the frame 14 whereby movement of the arms 19 between the positions shown in FIGS. 1 and 3 causes the chains to tension and move the carriage along the arms 19.

In use of the loader of this embodiment, with the loader in the position shown in FIG. 1, the hydraulic cylinders 55 and 34 are in fully retracted positions and the tynes 29 extend substantially parallel to the ground with the links 32 engaged behind the outermost platform members 24 to restrict further pivotal movement of the tynes relative to the platform 17. A bale 41 of hay or the like is loaded onto the tynes 29 by movement of the loader. In this embodiment, the frame 14 is supported at its front end by an appropriate agricultural tractor.

Actuation of the hydraulic cylinders 55 causes pivotal movement of the platform 17 about the pivot pins 18 so that the platform 17 and tynes 29 take up the position as shown in FIG. 2. In this position, the weight of the bale 41 is carried by the hydraulic cylinders 55 and 34 as well as the arms 19 which are supported by angles 42 on the ends of the frame sections 22.

Actuation of the hydraulic cylinder 34 then causes pivotal movement of the arms 19 about the pins 23 to thereby lift the platform 17 to the position shown in FIG. 3. In movement of the arms 19 to this position, the chains 51 become tensioned as the arms 19 approach their upper limit of movement and the chains impart a movement to the carriage 52 to assist movement of a bale thereon towards the feeder 12. The bale 41 then moves from the platform 17 onto the feeder 12, such movement also being assisted by the weight of the tynes 29 which are tending to pivot about their pivotable connection to the platform 17.

When the bale 41 has been discharged from the platform 17, the tynes can pivot to the position shown in FIG. 3.

When it is desired to pick up another bale, the cylinders 34 and 55 are again retracted so as to move the arms to their lower position and to rotate the platform 17 about the pivotal connection with the arms until it reaches a substantially upright position. In this position, the tynes 29 fall to the ground under the influence of gravity to a position ready for picking up the next bale.

By judicious control of the hydraulic cylinders, it is possible to load one or more bales on the feeder 12, to load a further bale onto the carrige 52 and to pick up another bale on the platform 17 whereby the plurality of bales can be transported from one place to another. Thus, the loader/feeder combination can be used to transport three or more bales in the one operation.

It will be appreciated that the loader of the invention may be used to handle round or other shaped bales of hay, straw and the like. The loader may be mounted on a feeder, as described, or may be mounted on a trailer or other apparatus to facilitate stacking and transportation.

I claim:

1. A bale loader
   comprising a pair of support arms each pivotally mounted at one end to a wheeled frame, said support arms being movable substantially vertically, means to restrict downward movement of said support arms, a loader platform pivotally mounted to and carried by the other ends of said support arms, said loader platform being movable between a first position and a second position, two or more tynes mounted to said loader platform to extend therefrom at a predetermined angle at least when said loader platform is in said first position, and actuating means operable to move the platform between the first and second positions and to move the arms and platform relative to the frame, wherein said arms carry a carriage movable therealong from a position adjacent the loader platform in its said second position towards said frame, and wherein a flexible line or chain extends between said carriage and said frame, said line or chain being of a length such that upward movement of the arms causes the line or chain to become tensioned.

2. A bale loader according to claim 1 wherein said tynes are pivoted to said loader platform.

3. A bale loader according to claim 1 wherein said loader platform is pivoted to said arms so as to be movable between said first position in which the platform is substantially upright and said tynes extend therefrom substantially horizontally and said second position in which said loader platform extends substantially parallel to said arms.

4. A bale loader according to claim 1 wherein said actuating means includes one or more hydraulic cylinders extending between the arms and the loader platform to cause pivotal movement of the loader platform relative to the arms.

5. A bale loader according to claim 1 wherein said actuating means includes a hydraulic cylinder extending between the frame and the loader platform and operable to cause pivotal movement of the arms relative to the frame.

6. A bale loader according to claim 1 wherein said tynes include links engageable with the loader platform to restrict relative movement therebetween.

7. A bale loader according to claim 1 wherein said loader platform comprises a plurality of parallel platform members, an upper cross member and a lower transverse member, the upper cross member extending beyond the outermost platform members so as to engage with the arms in the said second position of the loader platform.

8. A bale loader according to claim 1 including means to restrict downward movement of the arms which comprise abutments extending from the frame and engaged by said arms in their lowermost position.

* * * * *